(12) United States Patent
Quintero

(10) Patent No.: US 7,148,183 B2
(45) Date of Patent: Dec. 12, 2006

(54) SURFACTANT-POLYMER COMPOSITION FOR SUBSTANTIALLY SOLID-FREE WATER BASED DRILLING, DRILL-IN, AND COMPLETION FLUIDS

(75) Inventor: Lirio Quintero, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 249 days.

(21) Appl. No.: 10/023,273

(22) Filed: Dec. 14, 2001

(65) Prior Publication Data

US 2003/0139297 A1 Jul. 24, 2003

(51) Int. Cl.
*C09K 8/08* (2006.01)

(52) U.S. Cl. .................. 507/110; 507/111; 507/134; 507/135; 507/120

(58) Field of Classification Search ........ 507/110, 507/111, 134, 135, 120
See application file for complete search history.

(56) References Cited

U.S. PATENT DOCUMENTS

| | | | | |
|---|---|---|---|---|
| 4,003,838 A | * | 1/1977 | Jackson et al. | 507/111 |
| 4,098,700 A | * | 7/1978 | Hartfiel | 507/111 |
| 4,828,724 A | * | 5/1989 | Davidson | 507/110 |
| 4,894,335 A | * | 1/1990 | Peignier et al. | 435/104 |
| 5,003,060 A | * | 3/1991 | Vinot | 536/114 |
| 5,260,269 A | * | 11/1993 | Hale et al. | 507/136 |
| 5,318,956 A | * | 6/1994 | Mueller et al. | 507/139 |
| 5,513,712 A | * | 5/1996 | Sydansk | 175/69 |
| 5,605,872 A | | 2/1997 | Engel et al. | |
| 5,783,525 A | | 7/1998 | Blanco | |
| 5,837,655 A | | 11/1998 | Halliday et al. | |
| 5,851,958 A | | 12/1998 | Halliday et al. | |
| 5,977,030 A | * | 11/1999 | House | 507/110 |
| 6,020,407 A | * | 2/2000 | Campbell et al. | 524/156 |
| 6,123,159 A | * | 9/2000 | Brookey et al. | 175/72 |
| 6,127,319 A | | 10/2000 | House | |
| 6,148,917 A | * | 11/2000 | Brookey et al. | 166/301 |
| 6,204,224 B1 | | 3/2001 | Quintero et al. | |
| 6,284,714 B1 | | 9/2001 | Bland et al. | |
| 6,422,326 B1 | * | 7/2002 | Brookey et al. | 175/72 |
| 6,596,670 B1 | * | 7/2003 | Mueller et al. | 507/136 |
| 2001/0027880 A1 | * | 10/2001 | Brookey | 175/65 |

FOREIGN PATENT DOCUMENTS

WO   WO 96/03474 A2 * 2/1996

OTHER PUBLICATIONS

Whistler, Roy L., et al., Starch: Chemistry and Technology, Chapter X, pp. 311-388, (1984).

* cited by examiner

*Primary Examiner*—Philip C. Tucker
(74) *Attorney, Agent, or Firm*—Paula Morris; Morris & Amatong, P.C.

(57) ABSTRACT

Water based drilling, drill-in, and completion fluids comprising surfactant-polymer blends that are effective to generate effective rheology comprising low shear rate viscosity and effective fluid loss control properties. The water based fluids preferably are substantially solid free.

153 Claims, 2 Drawing Sheets

SURFACTANT-POLYMER COMPOSITION FOR SUBSTANTIALLY SOLID-FREE WATER BASED DRILLING, DRILL-IN, AND COMPLETION FLUIDS

FIELD OF THE INVENTION

The present invention relates to water based drilling, drill-in, and completion fluids (hereafter collectively called "drilling fluids") comprising surfactant-polymer blends that are effective to generate low shear rate viscosity (LSRV), to provide fluid loss control, and to stabilize the dispersed phase. The water based drilling fluids preferably have a relatively low density and are substantially solid free.

BACKGROUND OF THE INVENTION

Drilling fluids serve various functions, such as promoting borehole stability, removing drilled cuttings from the wellbore, cooling and lubricating the bit and the drillstring, as well as controlling subsurface pressure. Specially formulated fluids are used in connection with completion and workover operations to minimize damage to the formation. Workover fluids are used during remedial work in the well, such as removing tubing, replacing a pump, logging, reperforating, and cleaning out sand or other deposits.

Formation damage can result when solids and/or filtrate derived from one of these fluids invades the formation during drilling operations. Such formation damage may be minimized by treating the well in a near-balanced condition (wellbore pressure close to formation pressure). Unfortunately, in high-pressure wells, the well often must be treated in an over-balanced and/or an under-balanced condition. If the well is over-balanced, the treating fluid is designed to temporarily seal perforations to prevent entry of fluids and solids into the formation. If the well is under-balanced, the treating fluid is designed to prevent entry of solids from the formation into the wellbore.

Current under-balanced drilling technologies use air, foams and aerated fluids. These air-based technologies solve some of the problems encountered drilling in under-balanced conditions; however, air based technologies are very costly.

Low density fluids have the capacity to control over-balanced and under-balanced formations. Water-based low density fluids are of particular interest because of environmental superiority and relatively low cost. In order to be effective, low density drilling fluids must have adequate rheology and fluid loss control properties. Viscosity and fluid loss may be controlled in low density fluids by adding certain polymers to the fluid. Solid bridging agents also generally are required to prevent fluid loss.

Unfortunately, solid bridging agents may plug pore throats in the reservoir rock. It would be desirable to formulate fluids which have the necessary rheology and fluid loss control properties without the need to use solid bridging agents.

SUMMARY OF THE INVENTION

The invention provides water-based drilling fluids having effective rheology with low shear rate viscosity and effective fluid control properties comprising water soluble polymers and surfactant adapted to associate with said water soluble polymers and to provide said effective rheology, and effective fluid loss control properties.

DETAILED DESCRIPTION OF THE INVENTION

Figure 1:
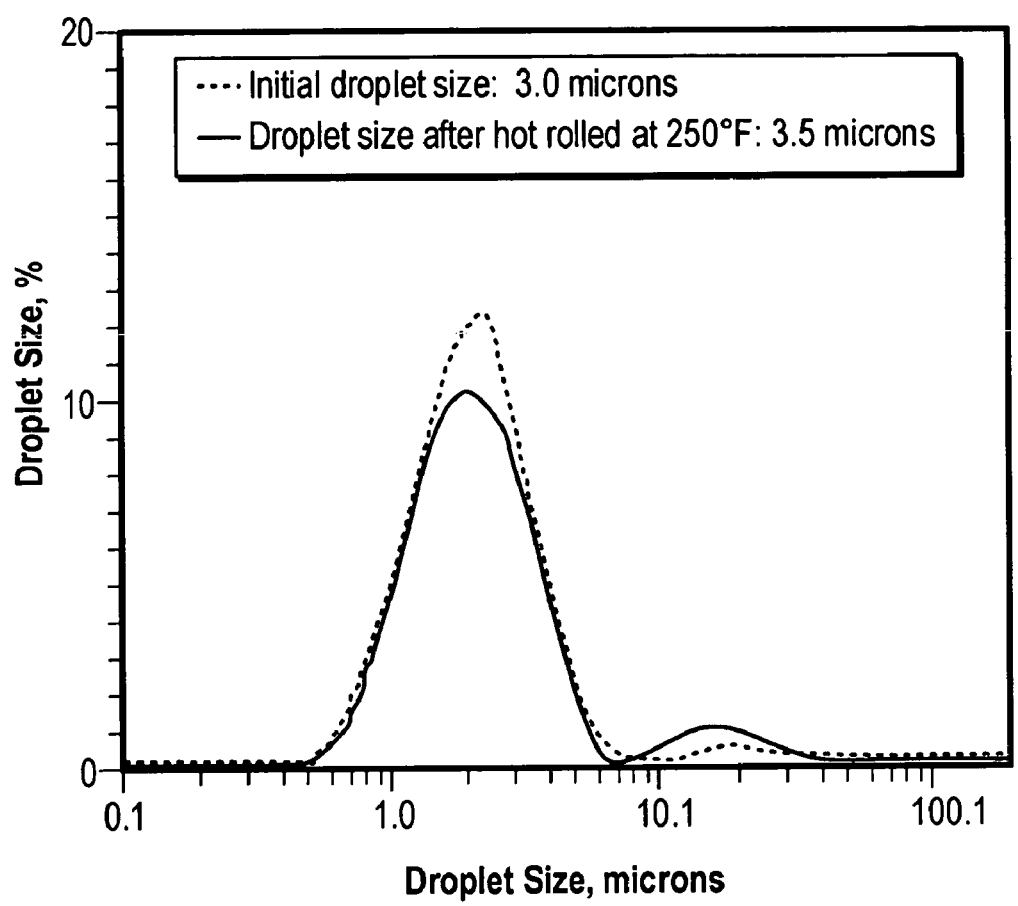
FIG. 1 is a graph of droplet size reduction with increasing surfactant concentration referred to in Example 1.

The present invention provides water based drilling fluids comprising surfactant-polymer blends that are effective to generate low shear rate viscosity (LSRV), to provide effective fluid loss control, and to stabilize the dispersed phase in the water based fluid. The water based drilling fluids preferably have relatively low density and are substantially solid free.

The drilling fluid preferably comprises water as a continuous phase and an internal phase comprising a water emulsifiable material. The water emulsifiable material comprises a concentration sufficient to provide effective lubrication. A preferred concentration of the water emulsifiable material is from about 2 to about 20 vol. %, most preferably about 5 vol. %.

The water emulsifiable material preferably is non-toxic. As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards.

Suitable water-emulsifiable materials are water-insoluble and include, but are not necessarily limited to olefins, paraffins, water insoluble polyglycols, water insoluble esters, water insoluble Fischer-Tropsch reaction products, and other non-toxic organic materials, and combinations thereof. Suitable olefins are branched and/or linear and preferably are relatively non-toxic synthetic olefins. Examples of preferred olefins include but are not necessarily limited to esters, polalphaolefins, linear alpha olefins, and internal olefins, typically skeletally isomerized olefins. Most preferred olefins are described in U.S. Pat. Nos. 5,605,872 and 5,851,958, incorporated herein by reference. Preferred paraffins are described in U.S. Pat. No. 5,837,655, incorporated herein by reference. Suitable polyglycols have a molecular weight sufficiently high to render them water insoluble. Preferred polyglycols are water insoluble polypropylene glycols. A most preferred polyglycol has an average molecular weight of at least about 2000, more preferably at least about 4000. Suitable polyglycols are available from a variety of commercial sources. A preferred polyglycol is POLYGLYCOL P-4000, available from Dow Chemical Co.

The drilling fluid also comprises water-soluble polymers or copolymers, hereinafter collectively referred to as "water-soluble polymers," that are capable of viscosifying the drilling fluid and/or providing fluid loss control for the drilling fluid. Preferred polymers are non-toxic and include, but are not necessarily limited to water soluble starches and modified versions thereof, water soluble polysaccharides and modified versions thereof, water soluble celluloses and modified versions thereof, and water soluble polyacrylamides and copolymers thereof. Generally, the quantity of polymer used is at least about 2 lb./bbl. or more, preferably about 7.5 lb./bbl. or more.

Starches that are suitable for use in the drilling fluid include, but are not necessarily limited to corn based and potato based starches, preferred starches being more temperature stable starches. Polysaccharides that are suitable for use in the present invention include, but are not necessarily limited to xanthan polysaccharides, wellan polysaccharides, scleroglucan polysaccharides, and guar polysaccharides. Celluloses that are suitable for use in the present invention include, but are not necessarily limited to hydrophobically modified hydroxyethyl celluloses and cationic cellulose ethers. Suitable copolymers of acrylamide include copolymers with acrylate monomers, hydrophobic N-isopropylacrylamide, and the like.

As used herein, the terms "modified starches" and "modified polysaccharides" or "synthetically modified polysaccharides" refer to starches and polysaccharides that have been chemically modified in a manner that renders them inherently non-fermentable in order to avoid the need for a preservative. Water-soluble "modified starches" and "modified polysaccharides" that should operate successfully as water-soluble polymers include, but are not necessarily limited to: hydroxyalkyl starches and polysaccharides; starch and polysaccharide esters; cross-link starches and polysaccharides; hypochlorite oxidized starches and polysaccharides; starch and polysaccharide phosphate monoesters; cationic starches and polysaccharides; starch and polysaccharide xanthates; and, dialdehyde starches and polysaccharides. These derivatized starches and polysaccharides can be manufactured using known means, such as those set forth in detail in Chapter X of *Starch: Chemistry and Technology* 311–388 (Roy L. Whistler, et al. eds., 1984), incorporated herein by reference.

Specific examples of suitable modified starches and modified polysaccharides include, but are not necessarily limited to: carboxymethyl starches and polysaccharides; hydroxyethyl starches and polysaccharides; hydroxypropyl starches and polysaccharides; hydroxybutyl starches and polysaccharides; carboxymethylhydroxyethyl starches and polysaccharides; carboxymethylhydroxypropyl starches and polysaccharides; carboxymethylhydroxybutyl starches and polysaccharides; epichlorohydrin starches and polysaccharides; alkylene glycol modified starches and polysaccharides; and, other starch and polysaccharide copolymers having similar characteristics. Preferred modified starches and/or modified polysaccharides comprise a functional group selected from the group consisting of a carboxymethyl group, a propylene glycol group, and an epichlorohydrin group.

A preferred polymer is a blend of modified polysaccharides and synthetically modified starch, preferably a blend comprising from about 10 wt. % to about 90 wt. % modified polysaccharide and from about 10 wt. % to about 90 wt. % synthetically modified starch. More preferably, the blend is from about 40 to about 60 wt. % synthetically modified polysaccharide with the remainder of the blend being synthetically modified starch. In a most preferred embodiment, the blend is a 50/50 wt. % blend of modified polysaccharide/synthetically modified starch.

Suitable modified polysaccharides have a weight average molecular weight of about 500,000 to about 2,500,000, preferably from about 700,000 to about 1,200,000, most preferably about 1,000,000. Preferred modified polysaccharides for use in the blend are xanthan polysaccharides. Suitable modified xanthan polysaccharides are commercially available and include, but are not necessarily limited to XAN-PLEX™, XAN-PLEX D™, XANVIS™, all of which are available from Baker Hughes INTEQ. A most preferred modified polysaccharide is commercially available as XAN-PLEX™ D from Baker Hughes INTEQ.

Suitable synthetically modified starches have a weight average molecular weight of from about 200,000 to about 2,500,000, preferably from about 600,000 to about 1,000,000. Preferred synthetically modified starches comprise a functional group selected from the group consisting of a carboxymethyl group, a propylene glycol group, and an epichlorohydrin group. Suitable synthetically modified starches include, but are not necessarily limited to BIO-PAQ™, BIOLOSE™, and PERMALOSE™, available from Baker Hughes INTEQ. A most preferred commercially available product is BIOLOSE™, available from Baker Hughes INTEQ. A preferred blend is 50/50 wt. % XAN-PLEXT™ D and BIOLOSE™.

The drilling fluid comprises a quantity of one or more surfactants which bind to the polymer. The surfactant(s) are believed to associate with the polymers, lowering interfacial properties, such as surface tension, and forming complex associations between the polymer and surfactant. The result is increased viscosification or gelation characterized by a micellar-type aggregate along the backbone of the polymer chain.

The type of surfactant used in a given fluid will vary with the type of polymer and the charge of pendant groups on the polymer. Where the polymer comprises groups susceptible to hydrogen bonding, the surfactant is substantially non-ionic, and more susceptible to forming hydrogen bonds with the surfactant. Where the polymer comprises pendant groups that are susceptible to ionic bonding, the surfactant is cationic or anionic. A variety of surfactants may be used as long as the surfactant bonds or associates with pendant groups on the polymer to produce three dimensional structures that are effective to increase the viscosity of the drilling fluid to a desired level.

The viscosity of a fluid is its internal resistance to flow as measured in centipoise units. The coefficient of viscosity of a normal homogeneous fluid at a given temperature and pressure is a constant for that fluid and independent of the rate of shear or the velocity gradient. Fluids that obey this rule are "Newtonian" fluids. In fluids called "non-Newtonian fluids," this coefficient is not constant but is a function of the rate at which the fluid is sheared as well as of the relative concentration of the phases. Drilling fluids generally are non-Newtonian fluids. Non-Newtonian fluids frequently exhibit plastic flow, in which the flowing behavior of the material occurs after the applied stress reaches a critical value or yield point (YP). Yield points in drilling fluids are frequently expressed in units of pounds per square 100 feet, wherein the yield point is a function of the internal structure of the fluid.

In drilling, once the critical value or yield point (YP) of the drilling fluid is achieved, the rate of flow or rate of shear typically increases with an increase in pressure, causing flow or shearing stress. The rate of flow change, known as plastic viscosity (PV), is analogous to viscosity in Newtonian fluids and is similarly measured in centipoise units. In drilling fluids, yield points (YP) above a minimum value are desirable to adequately suspend solids, such as weighting agents and cuttings. The fluid preferably has a yield point of from about 20 to about 50, preferably 30 or more pounds per 100 square feet.

The polymer and surfactant produce a drilling fluid having "low shear rate viscosity," defined herein as a viscosity of at least about 70,000 upon exposure to 0.3 rpm, measured with a Brookfield viscometer at 75° F. Preferably, the polymer/surfactant structures produce a viscosity of at least about 100,000 cP, preferably about 200,000 cP upon exposure to 0.3 rpm.

The surfactant preferably aids in emulsifying the water emulsifiable material, producing droplets having an average diameter as small as possible. The droplet size will depend upon the water emulsifiable material, and may be relatively large as long as the resulting fluid has effective rheology and fluid loss control properties. Suitable average diameters for the droplets are about 35 microns or less, preferably about 20 microns or less, more preferably about 15 microns or less, and most preferably about 5 microns or less. The surfactant also reduces the surface tension of the water based fluid. The surface tension of water is about 74 nN/m. Preferred surfactants reduce the surface tension of the water based fluid to from about 25 to about 40 nN/m, preferably to about 36 nN/m.

Suitable surfactants include, but are not necessarily limited to alkyl sulfates, alkyl ether sulfates, alkyl sulfonates, ethoxylated esters, ethoxylated glycoside esters, alcohol ethers, and phosphated esters comprising about 8 to about 18 carbon atoms, preferably about 8 to about 12 carbon atoms, and salts thereof. Preferred surfactants are selected from the group consisting of alkyl sulfates and alkyl ether sulfates, more preferably salts of a trialkyl ether sulfates, most preferably sodium tridecyl ether sulfate. The quantity of surfactant used is sufficient to achieve the foregoing rheological properties. The amount of surfactant used typically is from about 0.2 lb./bbl. to about 4 lb./bbl., preferably about 2 lb./bbl.

Where a fluid is expected to encounter relatively high temperatures, typically about 220° F. or more, the fluid preferably comprises a salt effective to increase thermal stability. The salt preferably comprises a compound selected from the group consisting of a sulfate and a sulfonate. The salt preferably is an alkali metal salt of a compound selected from the group consisting of a sulfate and a sulfonate, most preferably an alkali metal salt of a compound selected from the group consisting of a thiosulfate and a thiosulfonate. A most preferred salt is sodium thiosulfate. Where necessary, the salt preferably comprises from about 0.2 lb./bbl. to about 3.0 lb./bbl., preferably about 1.5 lb./bbl.

It is preferred for the drilling fluid to be substantially solids free, however, other conventional additives may be used in the fluid. Such additives include, but are not necessarily limited to shale stabilizer(s), filtration control additive(s), suspending agent(s), dispersant(s), thinner(s), anti-balling additive(s), lubricant(s), weighting agent(s), seepage control additive(s), lost circulation additive(s), drilling enhancer(s), penetration rate enhancer(s), corrosion inhibitor(s), acid(s), base(s), buffer(s), scavenger(s), gelling agent(s), cross-linker(s), catalyst(s), soluble salts, biocides, and combinations thereof. Although it is preferred for the drilling fluid not to contain solid bridging agents, one or more bridging and/or weighting agents may be added to the fluid. Suitable shale stabilizers include, but are not necessarily limited to polyglycols, inorganic salts, chelates, amines, alkanolamines, alkanolamides, amphoteric compounds, alone or in aqueous solutions, and mixtures thereof. Suitable shale stabilizing inorganic salts include, but are not necessarily limited to alkali metal salts, silicate salts, and aluminum salts. Acids include acids used to treat cement contamination.

The fluid is prepared using conventional procedures, with the polymer and surfactant being added before the dispersant and water emulsifiable material, if used. The pH of the fluid is measured and, if needed, adjusted to from about 8.5 to about 11.5, preferably about 9.5. The pH preferably is adjusted using a suitable organic base as a buffer. Substantially any buffer may be used as long as it does not interfere with the surfactant and does not affect the stability of the generated droplet size. Preferred buffers include, but are not necessarily limited to ethanolamines, alkali metal hydroxides, preferably sodium or potassium hydroxide, alkali metal acetates, preferably sodium or potassium acetate. Preferred buffers are ethanolamines, more preferably mono-ethanolamine or diethanolamine, and most preferably mono-ethanolamine.

The drilling fluids have a relatively low density depending upon the particular quantities and components used. The density generally is about 7.9 lb./bbl. or more, preferably about 8.1 lb./bbl. or more. The drilling fluids exhibit low shear rate viscosity (LSRV), which resists fluid movement into the formation zone and inhibits lost circulation. The fluids comprise a stabilized emulsion of very small droplets of water emulsifiable material stabilized by the surfactant polymer complex. The stabilized droplets help to control filtrate invasion. The fluids exhibit high viscosity at low shear rate, high yield point, low plastic viscosity, high gel strength, with thermal stability up to 300° F. Excellent fluid loss control is obtained at differential pressures of about 50 psi or more, preferably up to about 1500 psi or more. The term "effective fluid loss control properties" is defined to mean that, using the "standard dynamic filtration fluid loss test" (API Recommended Practice 13B-1), the measured fluid loss is about 18 ml./30 min. or less. Preferably the fluid loss is 5 ml./30 min. or less, more preferably about 1 ml./30 min. or less, even more preferably about 0.5 ml./30 min. or less. The fluids exhibit a lower surface tension than most water based drilling fluids, which maintain or improve the mobility of the crude oil in water-wet reservoirs, leading to better productivity. The absence of solid bridging agents in preferred formulations decreases the risk of plugging of the pore throats in the reservoir rock. The drilling fluids also prevent fluid losses to the formation in depleted reservoirs.

The invention will be better understood with reference to the following examples, which are illustrative only, and should not be construed as limiting the invention:

Selection of Surfactants

Surfactant screening was performed using various anionic and nonionic surfactants, including branched alcohol ethoxylates, sodium alkyl sulfates, and sodium ether sulfates.

Surfactant screening for the isomerized olefin internal phase in-water and high molecular weight polyglycol-in-water emulsification shows that the most effective surfactant is sodium tridecyl ether sulfate. This surfactant generated emulsions with initial droplet size of less than 10 microns, which remained stable after hot rolling at 200° F. However, the droplet size increased considerably (78 microns) when the emulsions were hot rolled at 250° F. The increased droplet size could be overcome by using a higher concentration of surfactant or by mixing the surfactant with other additives, such as a polymer, that could improve thermal stability of the drilling fluid.

| Screening of surfactants in a 70/30 olefin base oil/water emulsification | | |
|---|---|---|
| | Droplet Size, microns | |
| Surfactant | Initial | After 250° F. Hot Roll |
| Isotridecyl alcohol ethoxylate, 10 EO | 7.8 | Unstable O/W |
| Oleyl alcohol ethoxylate, 20 EO | 8.5 | Unstable O/W |

-continued

Screening of surfactants in a 70/30
olefin base oil/water emulsification

| Surfactant | Droplet Size, microns | |
|---|---|---|
| | Initial | After 250° F. Hot Roll |
| Sodium octyl sulfate | 68.0 | Unstable O/W |
| Sodium linear alcohol ether (6) phosphate | 14.2 | Unstable O/W |
| Sodium tridecyl ether sulfate | 7.2 | 78.7 |

Evaluation and selection of polymers was performed in conjunction with surfactant. Testing at temperatures up to 250° F. was carried out with a combination of surfactant and polymers, in order to define the best product combination and optimum concentrations to produce a fluid with low shear rate viscosity, high yield point, low plastic viscosity, and high gel strength. Commercially available polysaccharides and starches were used for viscosity and filtration control. Product selection was based on evaluation of rheology and emulsion droplet size after fluids were hot rolled at 200° F. and 250° F. for 16 hours. The polymers used in the following experiments were selected. The polymers were used at a 50:50 ratio, unless otherwise indicated.

EXAMPLE 1

A polymer blend (XANTHAN D/BIOLOSE) with the surfactant (sodium ether sulfate) was used in a base formulation with 95/5 water/isomerized olefin ratio, 6 lb./bbl. polymer blend, 0.5 lb./bbl. monoethanolamine (MEA), and 5 lb./bbl. sodium formate, and between 0.5 and 6 lb./bbl. of surfactant.

The fluids were mixed in a baffled two-liter conical mixing cup, using a Prince Castle mixer operating initially at about 8500 rpm to mix the polymer in water; then the mixing speed was reduced between 6000 to 6500 rpm to reduce foam formation. A defoamer may be used, if necessary. The order of mixing is not critical. The following Table describes the order of addition in this experiment. The non-polar internal phase was isomerized olefins, specifically GT-2700™ obtained from Baker Hughes INTEQ), polypropylene glycol P-2000 (Dow Chemical Company), or P-4000 (Dow Chemical Company).

| Additives by order of addition |
|---|
| Additives |
| Water |
| Viscosifier + Filtration Control |
| Buffer |
| Surfactant |
| Dispersed or internal phase (oil or glycol) |
| Shale inhibitor and others |

The following Table and FIG. 1 give the droplet size reduction with increasing surfactant concentration in the described base formulation.

| Effect of surfactant concentration on mean droplet size of base formulations | | | |
|---|---|---|---|
| Surfacant | | Droplet Size, microns | |
| Concentration, lb/bbl | Internal Phase in Water | Initial | After 250° F. Hot Roll |
| 0.5 | Olefin | 7.8 | 9.4 |
| 3.0 | Olefin | 4.4 | 4.2 |
| 6.0 | Olefin | 3.0 | 3.5 |
| 0.5 | Polyglycol P-400 | 12.5 | 33.3 |
| 6.0 | Polyglycol P-400 | 7.2 | 15.5 |

The foregoing demonstrates a reduction from 9.4 to 3.5 microns by changing surfactant concentration from 0.2 to 2 lb./bbl. in formulations with isomerized olefin. This effect was more noticeable in polyglycol formulations that exhibited decreased droplet size from 33.3 to 15.5 microns as surfactant concentration was increased from 0.2 to 2 lb./bbl. The olefin droplets form part of the viscoelastic complexes that control the formation and, at the same time, function to give some lubricity to the fluid.

MEA was used for pH control because it did not interfere with the surfactant, and therefore did not affect the stability of the generated droplet size. Magnesium oxide was evaluated also as a pH buffer, but is not preferred because of slightly increased droplet size. Surfactant screening was performed using various anionic and nonionic surfactants, including branched alcohol ethoxylates, sodium alkyl sulfates, and sodium alkyl ether sulfates.

EXAMPLE 2

Effect of Temperature in the Formulations

To obtain the desired rheological properties and also to maintain thermal stability up to 270° F., other additives were evaluated in conjunction with the base formulation. Sodium thiosulfate was found to improve the thermal stability of the drill-in fluid formulations. The following Table show the formulations used:

| Formulations for temperature evaluation | | |
|---|---|---|
| Additives | Formulation for application < 200° F. | Formulation for application up to 270° F. |
| Water, bbl | 0.95 | 0.95 |
| Isomerized olefin bbl | 0.05 | 0.05 |
| Polymer blend, lb/bbl | 6 | 6 |
| Monoethanolamine, lb/bbl | 0.5 | 0.5 |
| Surfactant, lb/bbl | 1 | 1 |
| Sodium formate, lb/bbl | 5 | 5 |
| Sodium thiosulfate, lb/bbl | — | 1.0 |

The following rheological properties were obtained with and without sodium thiosulfate:

Rheological properties (without sodium thiosulfate, <200° F.)

Measured at 120° F. using FANN 35 Viscometer

| Properties | Initial | After H.R. at 150° F. | After H.R. at 200° F. | After H.R. at 220° F. | After H.R. at 250° F. |
|---|---|---|---|---|---|
| 6 rpm | 25 | 27 | 28 | 17 | 16 |
| 3 rpm | 22 | 24 | 25 | 13 | 12 |
| 10-sec Gel | 23 | 25 | 26 | 13 | 12 |
| 10-min Gel | 28 | 32 | 33 | 15 | 15 |
| 30-min Gel | 31 | 33 | 35 | 16 | 16 |
| PV, cP | 11 | 10 | 11 | 10 | 9 |
| YP, lbf/100 ft$^2$ | 45 | 48 | 48 | 43 | 43 |

H.R.: Hot-rolled for 16 hours

Rheological properties (with sodium thiosulfate, up to 270° F.)

Measured at 120° F. using FANN 35 Viscometer

| Properties | Initial | After H.R. at 150° F. | After H.R. at 200° F. | After H.R. at 220° F. | After H.R. at 250° F. | After H.R. at 270° F. |
|---|---|---|---|---|---|---|
| 6 rpm | 25 | 27 | 28 | 28 | 25 | 25 |
| 3 rpm | 22 | 24 | 25 | 25 | 22 | 22 |
| 10-sec Gel | 23 | 25 | 26 | 26 | 22 | 22 |
| 10-min Gel | 28 | 32 | 33 | 29 | 25 | 25 |
| 30-min Gel | 31 | 33 | 35 | 30 | 26 | 27 |
| PV, cP | 11 | 10 | 11 | 8 | 8 | 8 |
| YP, lbf/100 ft$^2$ | 45 | 48 | 48 | 47 | 48 | 47 |

H.R.: Hot-rolled for 16 hours

Formulations without sodium thiosulfate had significantly decreased low rpm readings, as well as decreased gel strength, when the sample was hot rolled at temperatures higher than 200° F. Addition of 0.5 lb./bbl. of sodium thiosulfate in formulations hot-rolled at 250° F. and 1 lb./bbl. of sodium thiosulfate in formulation hot-rolled at 270° F. maintained the rheological properties of the fluids.

EXAMPLE 3

Rheological Properties and Dynamic Filtration Evaluation

The following shows polyglycol/water formulations with various concentrations of surfactant and the properties of these formulations, measured after hot rolling at 200° F.:

Effect of surfactant concentration on mud formulation containing polyglycol as a dispersed phase

| | Formulation 1 | Formulation 2 | Formulation 3 |
|---|---|---|---|
| Additives | | | |
| Water, bbl | 0.95 | 0.95 | 0.95 |
| Modified polysaccharide polymer/starch derivative, lb/bbl | 6 | 6 | 6 |
| Surfactant, lb/bbl | 0.5 | 0 | 6 |
| Monoethanolamine, lb/bbl | 0.5 | 0.5 | 0.5 |
| Sodium formate, lb/bbl | 5 | 5 | 5 |

-continued

Effect of surfactant concentration on mud formulation containing polyglycol as a dispersed phase

| | Formulation 1 | Formulation 2 | Formulation 3 |
|---|---|---|---|
| POLYGLYCOL P-2000, bbl | 0.05 | 0.05 | 0.05 |
| REV-DUST, lb/bbl | — | — | — |
| 120° F. Properties After Hot Roll at 200° F. | | | |
| 6 rpm | 29 | 29 | 28 |
| 3 rpm | 26 | 26 | 25 |
| Plastic viscosity, cP | 10 | 11 | 11 |
| Yield point, lb/100 ft$^2$ | 50 | 50 | 47 |
| 10 s/10 min/30 min gels, lb/100 ft$^2$ | 27/33/34 | 27/32/34 | 25/32/33 |
| Density, lb/gal | 7.9 | 7.7 | 7.8 |
| PH | 9.8 | 9.7 | 9.7 |
| Mean particle size, microns (without Rev-dust) | 33 | 18 | 15.5 |
| $^{(1)}$Spurt loss ml/30 min filtrate*2 | 6/15.2 | 5/13 | 2.8/10.6 |

$^{(1)}$2% REV-DUST ™, a simulated drilled product which may be obtained from Mil-White Company, Houston, Texas, was added to the samples used for the dynamic filtration test.

Rheological properties did not significantly change with increasing surfactant concentration from 0.2 to 2 lb./bbl. The results also indicate that increased concentration of surfactant decreased spurt loss and the total accumulated filtrate volume measured in the dynamic filtration test.

Without being limited to a particular theory or mechanism of action, the surfactants are believed to have an attractive interaction with modified polysaccharide polymers (cyclo-linear or branched) and macromolecular starch derivatives, and to form complexes sometimes described as a "Necklace model." This structure is believed to be characterized by a micellar-type aggregate along the backbone of the polymer chain that could be responsible for the reduction of filtrate volume in the evaluated formulations.

EXAMPLE 4

Formulations with isomerized olefins as the internal phase were evaluated by varying the additive concentration with the following results:

Mud formulation containing 7.5 lb/bbl of polymers blend

| Additives | Base Formulation | 120° F. Properties after hot roll at 200° F. | |
|---|---|---|---|
| Water, bbl | 0.95 | 6-rpm reading | 28 |
| Modified polysaccharide polymer/starch derivative, lb/bbl | 7.5 | 3-rpm reading | 23 |
| Surfactant, lb/bbl | 6 | Plastic viscosity, cP | 19 |
| Monoethanolamine, lb/bbl | 0.5 | Yield point, lb/100 ft$^2$ | 60 |
| Sodium formate, lb/bbl | 5 | 10-sec gels, lb/100 ft$^2$ | 26 |

-continued

Mud formulation containing 7.5 lb/bbl of polymers blend

| Additives | Base Formulation | 120° F. Properties after hot roll at 200° F. | |
|---|---|---|---|
| Isomerized olefins, bbl | 0.05 | 10-min gels, lb/100 ft² | 30 |
| | | 30-min gels, lb/100 ft² | 32 |
| | | pH | 9.8 |
| | | Droplet size, microns | 3.5 |

Figure 2:
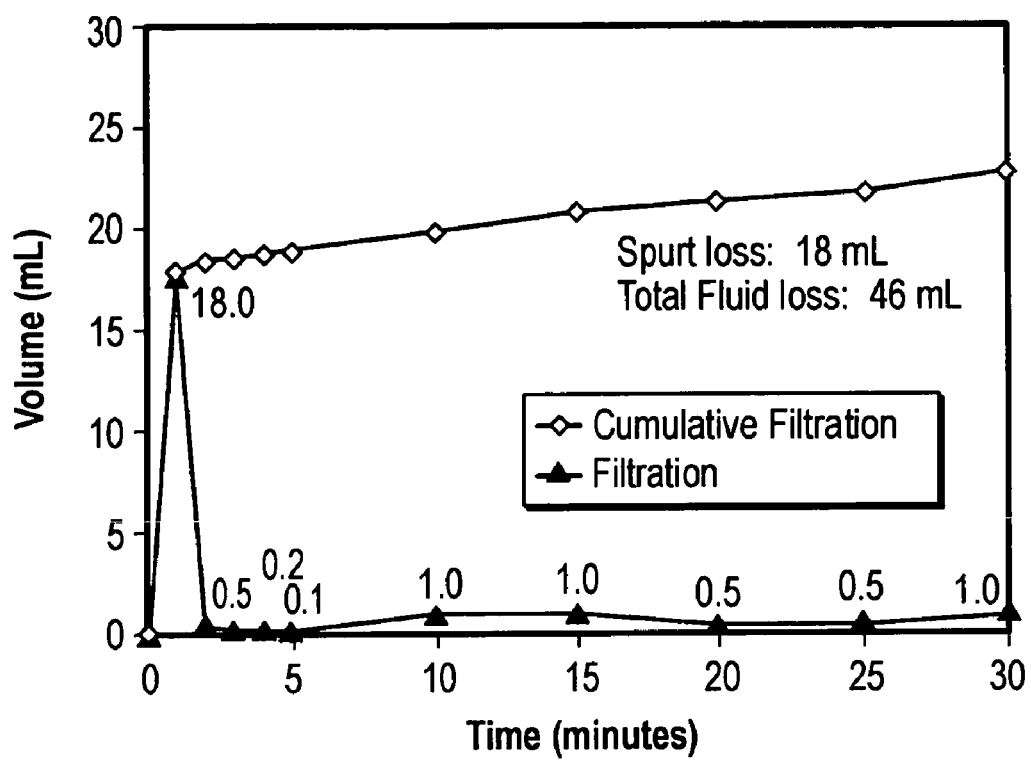
FIG. 2 is a graph of spurt loss of a formulation with 7.5 lb./bbl of polymers blend, referred to in Example 4.

The foregoing Table and FIG. 2 indicates that a formulation containing 7.5 lb./bbl of polymers blend and 2 lb./bbl of surfactant produces a fluid with acceptable rheological properties.

The rheological properties measured with Fann 35 exhibit (1) high initial gel strengths without evidence of progressively increasing gels, (2) high values for low rpm reading, and (3) relatively low plastic viscosities The average droplet sizes obtained using isomerized olefins as the internal phase were smaller than those obtained with the formulations containing P-2000 as internal phase (3 microns vs 15 microns).

This formulation was also evaluated using ECO-FLOW™ (paraffin oil) instead of isomerized olefins, and the properties of the formulated fluids were very similar.

EXAMPLE 5

Low shear rate viscosity (LSRV) was measured using the Brookfield viscometer at 75° F., with the following results:

The results show a thixotropic behavior, with viscosity on the order of 70,000 to 200,000 cP at 0.3 rpm, dropping to a range of 1220 to 1839 at 60 rpm

EXAMPLE 6

Dynamic Filtration of Formulations

Dynamic filtration of formulations, without solid bridging agents, was measured using 3 microns & 0.4 D aloxite disks, with the following results:

| | Dynamic filtration. |
|---|---|
| | Formulation 1, Cumulative |
| Water, bbl | 0.95 |
| Modified | 6 |
| | Filtration, ml |
| | T-200° F. |
| | Speed = 100 rpm |
| | Disk with 0.4 D |
| Additives | and 3 microns |
| polysaccharide polymer/starch derivative, lb/bbl | |
| Surfactant, lb/bbl | 6 |
| Monoethanolamine, lb/bbl | 0.5 |
| Sodium formate, lb/bbl | 5 |
| GT-2700 ™, bbl | 0.05 |
| Rev-Dust, % wt/wt | 2 |
| Time, minutes | ΔP = 500 psi |
| 0 | 0 |
| 1 | 5.0 |
| 5 | 6.4 |

Low shear rate viscosity (LSRV) measured with the Brookfield viscometer

| | Formulation 1 | Formulation 2 | Formulation 1 +2% Rev-Dust | Formulation 2 +2% Rev-Dust |
|---|---|---|---|---|
| Additivies | | | | |
| Water, bbl | 0.95 | 0.95 | 0.95 | 0.95 |
| Modified polysaccharide polymer/ starch derivative, lb/bbl | 6 | 7 | 6 | 7.5 |
| Surfactant, lb/bbl | 6 | 6 | 6 | 6 |
| MEA, lb/bbl | 0.5 | 0.5 | 0.5 | 0.5 |
| Sodium formate, lb/bbl | 5 | 5 | 5 | 5 |
| Isomerized olefins, bbl | 0.05 | 0.05 | 0.05 | 0.05 |
| Rev-Dust, % wt/wt | — | — | 2 | 2 |

| Dial Reading After Hot Roll at 200° F. | Brookfeild Viscosity, cP at 75 ± 1° F. | | | |
|---|---|---|---|---|
| 60 rpm | 1224 | 2949 | 1839 | 4229 |
| 30 rpm | 1996 | 5019 | 2987 | 7278 |
| 12 rpm | 3899 | 10423 | 5939 | 15230 |
| 6 rpm | 6589 | 18296 | 10138 | 27027 |
| 3 rpm | 11198 | 32493 | 17463 | 47990 |
| 1.5 rpm | 19196 | 55855 | 30553 | 85982 |
| 0.6 rpm | 39659 | 122474 | 64853 | 181961 |
| 0.3 rpm | 68652 | 196958 | 115175 | 318932 |

-continued

| Dynamic filtration. | |
|---|---|
| 10 | 6.6 |
| 15 | 7.2 |
| 20 | 7.8 |
| 25 | 8.0 |
| 30 | 8.4 |
| Spurt loss/30 min filtrate*2, ml | 5.0/16.2 |

The foregoing results indicate that formulations contaminated with 2% of solid produced a spurt loss of 5 mL and filtrate volumes of 16.2 ml.

EXAMPLE 7

Surface Tension Evaluation

Surface tension strongly influences the flow of the fluid by reducing the surface viscosity and the surface elasticity. Surface tension of solutions containing (1) polymer blend (2) polymer blend and surfactant were measured using the Wilhelmy plate method. The surface tension of water was measured as a reference. The following were the results:

Measurement of surface tension

| Sample | Concentration (g/L) | Surface Tension (mN/m) |
|---|---|---|
| Water | — | 71 |
| Polymer/Water | 2 | 66 |
| Surfactant/Polymer/Water | 0.1 (surfactant) 2 (polymers blend) | 54.8 |
| Surfactant/Polymer/Water | 0.25 (surfactant) 2 (polymers blend) | 41.6 |
| Surfactant/Polymer/Water | 0.5 (surfactant) 2 (polymers blend) | 35.4 |

The foregoing results indicate:

Little surface activity was observed with the sample of polymer blend in water, which only reduced the surface tension of the water from 71 to 66 mN/m.

The addition of 0.5 g/L of surfactant to the polymer solution generated a reduction of surface tension from 66 to 35.4 nN/m.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

I claim:

1. A water-based drilling fluid comprising:
   an aqueous base;
   about 7.5 lb./bbl. 50/50 wt. % modified xanthan polysaccharide and synthetically modified starch; and,
   about 2 lb./bbl. surfactant in association with said water soluble polymer;
   wherein said water soluble polymer, said surfactant, and said association provide said water-based drilling fluid with effective rheology and fluid loss control properties comprising low shear viscosity.

2. The water-based drilling fluid of claim 1 wherein said surfactant is selected from the group consisting of alkyl sulfates, alkyl ether sulfates, alkyl sulfonates, ethoxylated esters, ethoxylated glycoside esters, alcohol ethers, and phosphated esters comprising about 8 to about 18 carbon atoms, alkali metal salts thereof, and combinations thereof.

3. The water-based drilling fluid of claim 1 wherein said surfactant is selected from the group consisting of alkyl sulfates and alkyl ether sulfates.

4. The water-based drilling fluid of claim 1 wherein said surfactant comprises an alkyl ether sulfate.

5. The water-based drilling fluid of claim 1 wherein said surfactant is sodium tridecyl ether sulfate.

6. The water-based drilling fluid of claim 1 wherein said low shear viscosity is about 70,000 cP or more upon exposure to 0.3 rpm, measured with a Brookfield viscometer at 75° F.

7. The water-based drilling fluid of claim 1 wherein said low shear viscosity is about 100,000 cP or more upon exposure to 0.3 rpm, measured with a Brookfield viscometer at 75° F.

8. The water-based drilling fluid of claim 3 wherein said low shear viscosity is about 70,000 cP or more upon exposure to 0.3 rpm, measured with a Brookfield viscometer at 75° F.

9. The water-based drilling fluid of claim 4 wherein said low shear viscosity is about 70,000 cP or more upon exposure to 0.3 rpm, measured with a Brookfield viscometer at 75° F.

10. The water-based drilling fluid of claim 5 wherein said low shear viscosity is about 70,000 cP or more upon exposure to 0.3 rpm, measured with a Brookfield viscometer at 75° F.

11. The water-based drilling fluid of claim 1 further comprising a concentration of non-toxic water emulsifiable material as an internal phase.

12. The water-based drilling fluid of claim 11 wherein said concentration is from about 2 to about 20 vol. %.

13. The water-based drilling fluid of claim 1 wherein said fluid consists essentially of additives other a solid bridging agent.

14. The water-based drilling fluid of claim 3 wherein said fluid consists essentially of additives other than a solid bridging agent.

15. The water-based drilling fluid of claim 6 wherein said fluid consists essentially of additives other than a solid bridging agent.

16. The water-based drilling fluid of claim 8 wherein said fluid consists essentially of additives other than a solid bridging agent.

17. The water-based drilling fluid of claim 9 wherein said fluid consists essentially of additives other than a solid bridging agent.

18. The water-based drilling fluid of claim 1 wherein said effective fluid l6ss control properties comprise a fluid loss of about 5 ml./30 min. or less using the standard dynamic filtration fluid loss test.

19. The water-based drilling fluid of claim 13 wherein said effective fluid loss control properties comprise a fluid loss of about 5 ml./30 min. or less using the standard dynamic filtration fluid loss test.

20. The water-based drilling fluid of claim 14 wherein said effective fluid loss control properties comprise a fluid loss of about 5 ml./30 min. or less using the standard dynamic filtration fluid loss test.

21. The water based drilling fluid of claim 1 wherein said surfactant produces a reduced surface tension of said water based drilling fluid.

22. The water based drilling fluid of claim 21 wherein said reduced surface tension of said water based drilling fluid is from about 25 to about 40 nN/m.

23. The water based drilling fluid of claim 13 wherein said surfactant produces a reduced surface tension of said water based drilling fluid.

24. The water based drilling fluid of claim 23 wherein said reduced surface tension of said water based drilling fluid is from about 25 to about 40 nN/m.

25. The water based drilling fluid of claim 18 wherein said surfactant produces a reduced surface tension of said water based drilling fluid.

26. The water based drilling fluid of claim 25 wherein said reduced surface tension of said water based drilling fluid is from about 25 to about 40 nN/m.

27. A water-based drilling fluid comprising:
an aqueous base;
about 7.5 lb./bbl. water soluble polymer comprising xanthan polysaccharides; and,
about 2 lb./bbl. surfactant in association with said water soluble polymer, said surfactant being selected from the group consisting of alkyl sulfates and alkyl ether sulfates;
said water based drilling fluid consisting essentially of additives other than a solid bridging agent;
wherein said water soluble polymer, said surfactant, and said association provide said water-based drilling fluid with effective rheology and fluid loss control properties comprising low shear viscosity of about 70,000 cP or more upon exposure to 0.3 rpm, measured with a Brookfield viscometer at 75° F.

28. A water-based drilling fluid comprising:
about 7.5 lb./bbl. water soluble polymer comprising from about 40 to about 60 wt. % xanthan polysaccharide and from about 40 to about 60 wt. % synthetically modified starch comprising one or more functional groups selected from the group consisting of carboxymethyl, propylene glycol, and epichlorohydrin functional groups;
about 2 lb./bbl. sodium tridecyl ether sulfate in association with said water soluble polymer; and
a concentration of a non-toxic water emulsifiable material as an internal phase;
wherein said water soluble polymer, said surfactant, and said association provide said water-based drilling fluid with effective rheology and fluid loss control properties comprising low shear viscosity.

29. The water-based drilling fluid of claim 28 wherein said water soluble polymer is selected from the group consisting of water soluble starches and modified versions thereof, water-soluble polysaccharides and modified versions thereof, water-soluble celluloses and modified versions thereof, water soluble polyacrylamides and copolymers thereof, and combinations thereof.

30. The water-based drilling fluid of claim 28 wherein said water soluble polymer is a combination comprising about 50 wt. % xanthan polysaccharide and about 50 wt. % synthetically modified starch comprising one or more functional groups selected from the group consisting of carboxymethyl, propylene glycol, and epichlorohydrin functional groups.

31. A water-based drilling fluid comprising:
an aqueous base;
about 7.5 lb./bbl. of water soluble polymer comprising a combination of about 50 wt. % xanthan polysaccharide and about 50 wt. % synthetically modified starch comprising one or more functional groups selected from the group consisting of a carboxymethyl group, a propylene glycol group, and an epichlorohydrin functional group;
about 2 lb./bbl. sodium tridecyl ether sulfate;
wherein said water soluble polymer, said surfactant, and said association provide said water-based drilling fluid with effective rheology and fluid loss control properties comprising low shear rate viscosity; and
wherein said water-based fluid consists essentially of additives other than solid bridging agents.

32. The water based drilling fluid of claim 31 further comprising a concentration of a non-toxic water emulsifiable material as an internal phase.

33. The water-based drilling fluid of claim 32 wherein said non-toxic water emulsifiable material is a water insoluble material selected from the group consisting of olefins, paraffins, water insoluble glycols, water insoluble esters, water insoluble Fischer-Tropsch reaction products, and combinations thereof.

34. The water-based drilling fluid of claim 31 further comprising an alkali metal salt of a compound selected from the group consisting of a thiosulfate and a thiosulfonate.

35. The water-based drilling fluid of claim 32 further comprising an alkali metal salt of a compound selected from the group consisting of a thiosulfate and a thiosulfonate.

36. The water-based drilling fluid of claim 31 wherein said water soluble polymer comprises 50/50 wt. % modified xanthan polysaccharide and synthetically modified starch.

37. The water-based drilling fluid of claim 32 wherein said water soluble polymer comprises 50/50 wt. % modified xanthan polysaccharide and synthetically modified starch.

38. The water-based drilling fluid of claim 34 wherein said water soluble polymer comprises 50/50 wt. % modified xanthan polysaccharide and synthetically modified starch.

39. The water-based drilling fluid of claim 35 wherein said water soluble polymer comprises 50/50 wt. % modified xanthan polysaccharide and synthetically modified starch.

40. The water-based drilling fluid of claim 31 wherein said low shear rate viscosity is about 70,000 cP or more upon exposure to 0.3 rpm, measured with a Brookfield viscometer at 75° F.

41. The water-based drilling fluid of claim 32 wherein said low shear rate viscosity is about 100,000 cP or more upon exposure to 0.3 rpm, measured with a Brookfield viscometer at 75° F.

42. The water-based drilling fluid of claim 33 wherein said low shear rate viscosity is about 70,000 cP or more upon exposure to 0.3 rpm, measured with a Brookfield viscometer at 75° F.

43. The water-based drilling fluid of claim 34 wherein said low shear rate viscosity is about 70,000 cP or more upon exposure to 0.3 rpm, measured with a Brookfield viscometer at 75° F.

44. The water-based drilling fluid of claim 35 wherein said low shear rate viscosity is about 70,000 cP or more upon exposure to 0.3 rpm, measured with a Brookfield viscometer at 75° F.

45. The water-based drilling fluid of claim 32 wherein said concentration is from about 2 to about 20 vol. %.

46. The water-based drilling fluid of claim 45 wherein said effective fluid loss control properties comprise a fluid loss of about 5 ml./30 rpm, or less using the standard dynamic filtration fluid loss test.

47. A water-based drilling fluid comprising:
an aqueous base comprising a concentration of about 20 vol. % or less non-toxic water emulsifiable material, as an internal phase;

a quantity of water soluble polymer comprising polymers selected from the group consisting of synthetically modified starches having a weight average molecular weight of from about 200,000 to about 2,500,000, said water soluble polymer further comprising xanthan polysaccharides; and, an amount of surfactant in association with said water soluble polymer, said surfactant being selected from the group consisting of alkyl sulfates, alkyl ether sulfates, alkyl sulfonates, ethoxylated esters, ethoxylated glycoside esters, alcohol ethers, and phosphated esters comprising about 8 to about 18 carbon atoms, alkali metal salts thereof, and combinations thereof;

wherein said quantity, said amount, and said association provide said water based drilling fluid with effective rheology and fluid loss control properties comprising a low shear rate viscosity of about 70,000 cP or more upon exposure to 0.3 rpm, measured with a Brookfield viscometer at 75° F.

48. The water-based drilling fluid of claim 47 wherein said effective rheology and fluid loss control properties comprise a low shear rate viscosity of about 100,000 cP or more upon exposure to 0.3 rpm, measured with a Brookfield viscometer at 75° F.

49. The water-based drilling fluid of claim 47 wherein said surfactant is selected from the group consisting of alkyl sulfates and alkyl ether sulfates.

50. The water-based drilling fluid of claim 47 wherein said surfactant comprises an alkyl ether sulfate.

51. The water-based drilling fluid of claim 48 wherein said surfactant is selected from the group consisting of alkyl sulfates and alkyl ether sulfates.

52. The water-based drilling fluid of claim 48 wherein said surfactant comprises an alkyl ether sulfate.

53. The water-based drilling fluid of claim 48 wherein said fluid consists essentially of additives other than a solid bridging agent.

54. The water-based drilling fluid of claim 51 wherein said fluid consists essentially of additives other than a solid bridging agent.

55. The water-based drilling fluid of claim 52 wherein said fluid consists essentially of additives other than a solid bridging agent.

56. The water-based drilling fluid of claim 47 wherein said effective fluid loss control properties comprise a fluid loss of about 5 ml./30 min. or less using the standard dynamic filtration fluid loss test.

57. The water-based drilling fluid of claim 51 wherein said effective fluid loss control properties comprise a fluid loss of about 5 ml./30 min. or less using the standard dynamic filtration fluid loss test.

58. The water-based drilling fluid of claim 55 wherein said effective fluid lass control properties comprise a fluid loss of about 5 ml./30 min. or less using the standard dynamic filtration fluid loss test.

59. The water-based drilling fluid of claim 55 wherein said effective fluid loss control properties comprise a fluid loss of about 1 ml./30 min. or less using the standard dynamic filtration fluid loss test.

60. The water based drilling fluid of claim 47 wherein said surfactant produces a reduced surface tension of said water based drilling fluid.

61. The water based drilling fluid of claim 1 wherein said reduced surface tension of said water based drilling fluid is from about 25 to about 40 nN/m.

62. The water-based drilling fluid of claim 55 wherein said concentration is from about 2 to about 20 vol. %.

63. The water-based drilling fluid of claim 47 wherein said water soluble polymer comprises one or more polymers selected from the group consisting of modified polysaccharides having a weight average molecular weight of about 500,000 to about 42,500,000.

64. The water-based drilling fluid of claim 47 wherein said water soluble polymer comprises one or more polymers selected from the group consisting of modified polysaccharides having a weight average molecular weight of about from about 700,000 to about 1,200,000.

65. The water-based drilling fluid of claim 47 wherein said water soluble polymer comprises polymers selected from the group consisting of synthetically modified starches having a weight average molecular weight of from about 600,000 to about 1,000,000.

66. The water-based drilling fluid of claim 63 wherein said synthetically modified polysaccharides comprise a functional group selected from the group consisting of a carboxymethyl group, a propylene glycol group, and an epichlorohydrin group.

67. The water-based drilling fluid of claim 47 wherein said synthetically modified starches comprise a functional group selected from the group consisting of a carboxymethyl group, a propylene glycol group, and an epichlorohydrin group.

68. The water-based drilling fluid of claim 47 having a density of about 7.9 lb./gal. or more.

69. A water-based drilling fluid comprising:

an aqueous base;

a quantity of water soluble polymer comprising one or more polymers selected from the group consisting of synthetically modified starches having a weight average molecular weight of from about 200,000 to about 2,500,000, said water soluble polymer further comprising xanthan polysaccharide;

an amount of surfactant in association with said water soluble polymer, said surfactant being selected from the group consisting of alkyl sulfates, alkyl ether sulfates, alkyl sulfonates, ethoxylated esters, ethoxylated glycoside esters, alcohol ethers, and phosphated esters comprising about 8 to about 18 carbon atoms, alkali metal salts thereof, and combinations thereof;

wherein said quantity, said amount, and said association provide said water-based drilling fluid with effective rheology and fluid loss control properties; and a concentration of about 20 vol. % or less non-toxic water emulsifiable material as an internal phase, said surfactant being effective to emulsify said water emulsifiable material and to produce emulsion droplets having an average diameter of about 30 microns or less.

70. The water-based drilling fluid of claim 69 wherein said surfactant is selected from the group consisting of alkyl sulfates and alkyl ether sulfates.

71. The water-based drilling fluid of claim 69 wherein said surfactant comprises an alkyl ether sulfate.

72. The water-based drilling fluid of claim 69 wherein said surfactant is sodium tridecyl ether sulfate.

73. The water-based drilling fluid of claim 69 wherein said surfactant is effective to emulsify said water emulsifiable material and to produce emulsion droplets having an average diameter of about 20 microns or less.

74. The water-based drilling fluid of claim 69 wherein said surfactant is effective to emulsify said water emulsifiable material and to produce emulsion droplets having an average diameter of about 15 microns or less.

75. The water-based drilling fluid of claim 69 wherein said surfactant is effective to emulsify said water emulsifiable material and to produce emulsion droplets having an average diameter of about 5 microns or less.

76. The water-based drilling fluid of claim 69 wherein said effective rheology and fluid loss control properties comprise a low shear rate viscosity of about 70,000 cP or more upon exposure to 0.3 rpm, measured with a Brookfield viscometer 75° F.

77. The water-based drilling fluid of claim 69 wherein said concentration is, from about 2 to about 20 vol. %.

78. The water-based drilling fluid of claim 69 wherein said concentration is about 5 vol. %.

79. The water-based drilling fluid of claim 73 wherein said concentration is about 5 vol. %.

80. The water-based drilling fluid of claim 69 wherein said non-toxic water emulsifiable material is a water insoluble material selected from the group consisting of olefins, paraffins, water insoluble glycols, water insoluble esters, water insoluble Fischer-Tropsch reaction products, and combinations thereof.

81. The water-based drilling fluid of claim 69 wherein said water emulsifiable material is a water insoluble material selected from the group consisting of olefins, paraffins, water insoluble glycols, and combinations thereof.

82. The water-based drilling fluid of claim 73 wherein said water emulsifiable material is a water insoluble material selected from the group consisting of olefins, paraffins, water insoluble glycols, and combinations thereof.

83. The water-based drilling fluid of claim 69 wherein said fluid consists essentially of additives other a solid bridging agent.

84. The water-based drilling fluid of claim 73 wherein said fluid consists essentially of additives other than a solid bridging agent.

85. The water-based drilling fluid of claim 79 wherein said fluid consists essentially of additives other than a solid bridging agent.

86. The water-based drilling fluid of claim 69 wherein said effective fluid loss control properties comprise a fluid loss of about 5 ml./30 min. or less using the standard dynamic filtration fluid loss test.

87. The water-based drilling fluid of claim 75 wherein said effective fluid loss control properties comprise a fluid loss of about 5 ml./30 min. or less using the standard dynamic c filtration fluid loss test.

88. The water-based drilling fluid of claim 69 wherein said effective fluid loss control properties comprise a fluid loss of about 1 ml./30 min. or less using the standard dynamic filtration fluid loss test.

89. The water-based drilling fluid of claim 75 wherein said effective fluid loss control properties comprise a fluid loss of about 1 ml./30 min. or less using the standard dynamic filtration fluid loss test.

90. The water based drilling fluid of claim 69 wherein said surfactant produces a reduced surface tension of said water based drilling fluid.

91. The water based drilling fluid of claim 90 wherein said reduced surface tension of said water based drilling fluid is from about 25 to about 40 nN/m.

92. The water based drilling fluid of claim 73 wherein said surfactant produces a reduced surface tension of said water based drilling fluid.

93. The water based drilling fluid of claim 92 wherein said reduced surface tension of said water based drilling fluid is from about 25 to about 40 nN/m.

94. The water-based drilling fluid of claim 69 wherein said water soluble polymer comprises one or more polymers selected from the group consisting of modified polysaccharides having a weight average molecular weight of about 500,000 to about 2,500,000.

95. The water-based drilling fluid of any of claims 69 wherein said water soluble polymer comprises one or more polymers selected from the group consisting of modified polysaccharides having a weight average molecular weight of about from about 700,000 to about 1,200,000.

96. The water-based drilling fluid of claim 69 wherein said water soluble polymer comprises one or more polymers selected from the group consisting of modified polysaccharides having a weight average molecular weight of about 600,000 to about 1,000,000.

97. The water-based drilling fluid of claim 69 wherein said synthetically modified starches comprise a functional group selected from the group consisting of a carboxymethyl group, a propylene glycol group, and an epichlorohydrin group.

98. The water-based drilling fluid of claim 94 wherein said synthetically modified polysaccharides comprise a functional group selected from the group consisting of a carboxymethyl group, a propylene glycol group, and an epichlorohydrin group.

99. A water-based drilling fluid comprising:
  an aqueous base comprising a concentration of about 20 vol. % or less non-toxic water emulsifiable material as an internal phase;
  about 2 lb./bbl. or more water soluble polymer comprising one or more polymers selected from the group consisting of synthetically modified starches having a weight average molecular weight of from about 200,000 to about 2,500,000, said water soluble polymers further comprising xanthan polysaccharides; and,
  about 0.2 lb./bbl. or more surfactant in association with said water soluble polymer, said surfactant being selected from the group consisting of alkyl sulfates, alkyl ether sulfates, alkyl sulfonates, ethoxylated esters, ethoxylated glycoside esters, alcohol ethers, and phosphated esters comprising about 8 to about 18 carbon atoms, alkali metal salts thereof, and combinations thereof;
  wherein said water soluble polymer, said surfactant, and said association provide said water-based drilling fluid with effective rheology and fluid loss control properties.

100. The water-based drilling fluid of claim 69 wherein said surfactant is selected from the group consisting of alkyl sulfates and alkyl ether sulfates.

101. The water-based drilling fluid of claim 99 wherein said surfactant comprises an alkyl ether sulfate.

102. The water-based drilling fluid of claim 99 wherein said surfactant is sodium tridecyl ether sulfate.

103. The water-based drilling fluid of claim 99 wherein said effective rheology and fluid loss control properties comprise a low shear rate viscosity of about 70,000 cP or more upon exposure to 0.3 rpm, measured with a Brookfield viscometer at 75° F.

104. The water-based drilling fluid of claim 99 wherein said concentration is from about 2 to about 20 vol. %.

105. The water-based drilling fluid of claim 101 wherein said concentration is from about 2 to about 20 vol. %.

106. The water-based drilling fluid of claim 99 wherein said fluid consists essentially of additives other a solid bridging agent.

107. The water-based drilling fluid of claim 101 wherein said fluid consists essentially of additives other than a solid bridging agent.

108. The water-based drilling fluid of claim 102 wherein said fluid consists essentially of additives other than a solid bridging agent.

109. The water-based drilling fluid of claim 99 wherein said effective fluid loss control properties comprise a fluid loss of about 5 ml./30 min. or less using the standard dynamic filtration fluid loss test.

110. The water-based drilling fluid of claim 108 wherein said effective fluid loss control properties comprise a fluid loss of about 5 ml./30 min. or less using the standard dynamic filtration fluid loss test.

111. The water based drilling fluid of claim 99 wherein said surfactant produces a reduced surface tension of said water based drilling fluid.

112. The water based drilling fluid of claim 111 wherein said reduced surface tension of said water based drilling fluid is from about 25 to about 40 nN/m.

113. The water based drilling fluid of claim 108 wherein said surfactant produces a reduced surface tension of said water based drilling fluid.

114. The water based drilling fluid of claim 113 wherein said reduced surface tension of said water based drilling fluid is from about 25 to about 40 nN/m.

115. The water based drilling fluid of claim 103 wherein said surfactant produces a reduced surface tension of said water based drilling fluid.

116. The water based drilling fluid of claim 115 wherein said reduced surface tension of said water based drilling fluid is from about 25 to about 40 nN/m.

117. The water-based drilling fluid of claim 99 wherein said water soluble polymer comprises one or more polymers selected from the group consisting of modified polysaccharides having a weight average molecular weight of about 500,000 to about 2,500,000.

118. The water-based drilling fluid of claim 99 wherein said water soluble polymer comprises one or more polymers selected from the group consisting of modified polysaccharides having a weight average molecular weight of from about 700,000 to about 1,200,000.

119. The water-based drilling fluid of claim 99 wherein said water soluble polymer comprises one or more polymers selected from the group consisting of synthetically modified starches having a weight average molecular weight of from about 600,000 to about 1,000,000.

120. The water-based drilling fluid of claim 99 wherein said synthetically modified starches comprise a functional group selected from the group consisting of a carboxymethyl group, a propylene glycol group, and an epichlorohydrin group.

121. The water-based drilling fluid of claim 117 wherein said synthetically modified polysaccharides comprise a functional group selected from the group consisting of a carboxymethyl group, a propylene glycol group, and an epichlorohydrin group.

122. The water-based drilling fluid of claim 99 wherein said water soluble polymer comprises about 50/50 wt. % modified xanthan polysaccharide and synthetically modified starch.

123. The water-based drilling fluid of claim 108 wherein said water soluble polymer comprises about 50/50 wt. % modified xanthan polysaccharide and synthetically modified starch.

124. A water-based drilling fluid comprising:
an aqueous base comprising a concentration of non-toxic water emulsifiable material as an internal phase;
a blend of water soluble polymers comprising from about 10 wt. % to about 90 wt. % modified polysaccharide and from about 10 wt. % to about 90 wt. % synthetically modified starch; and,
an amount of surfactant in association with said water soluble polymer, said surfactant being selected from the group consisting of alkyl sulfates, alkyl ether sulfates, alkyl sulfonates, ethoxylated esters, ethoxylated glycoside esters, alcohol ethers, and phosphated esters comprising about 8 to about 18 carbon atoms, alkali metal salts thereof, and combinations thereof;
wherein said quantity, said amount, and said association provide said water based drilling fluid with effective rheology and fluid loss control properties comprising a low shear rate viscosity of about 70,000 cP or more upon exposure to 0.3 rpm, measured with a Brookfield viscometer at 75° F.

125. The water-based drilling fluid of claim 124 wherein said effective rheology and fluid loss control properties comprise a low shear rate viscosity of about 100,000 cP or more upon exposure to 0.3 rpm, measured with a Brookfield viscometer at 75° F.

126. The water-based drilling fluid of claim 124 wherein said surfactant is selected from the group consisting of alkyl sulfates and alkyl ether sulfates.

127. The water-based drilling fluid of claim 124 wherein said surfactant comprises an alkyl ether sulfate.

128. The water-based drilling fluid of claim 124 wherein said fluid consists essentially of additives other than a solid bridging agent.

129. The water-based drilling fluid of claim 124 wherein said effective fluid loss control properties comprise a fluid loss of about 5 ml./30 min. or less using the standard dynamic filtration fluid loss test.

130. The water-based drilling fluid of claim 124 wherein said effective fluid loss control properties comprise a fluid loss of about 1 ml./30 min. or less using the standard dynamic filtration fluid loss test.

131. The water-based drilling fluid of claim 124 wherein said water modified polysaccharides have a weight average molecular weight of about 500,000 to about 2,500,000.

132. The water-based chilling fluid of claim 124 wherein said water soluble polymer comprises one or more polymers selected from the group consisting of modified polysaccharides having a weight average molecular weight of about from about 700,000 to about 1,200,000.

133. The water-based drilling fluid of claim 124 having a density of about 7.9 lb./gal. or more.

134. A water-based drilling fluid comprising:
an aqueous base comprising a concentration of about 20 vol. % or less non-toxic water emulsifiable material as an internal phase;
a blend of water soluble polymers comprising from about 10 wt. % to about 90 wt. % modified polysaccharide and from about 10 wt. % to about 90 wt. % synthetically modified starch; and,
an amount of surfactant in association with said Water soluble polymer, said surfactant being selected from the group consisting of alkyl sulfates, alkyl ether sulfates, alkyl sulfonates, ethoxylated esters, ethoxylated glycoside esters, alcohol ethers, and phosphated esters comprising about 8 to about 18 carbon atoms, alkali metal salts thereof, and combinations thereof;
wherein said quantity, said amount, and said association provide said water based drilling fluid with effective rheology and fluid loss control properties comprising a low shear rate viscosity of about 70,000 cP or more upon exposure to 0.3 rpm, measured with a Brookfield viscometer at 75° F.

135. The water-based drilling fluid of claim 134 wherein said surfactant is selected from the group consisting of alkyl sulfates and alkyl ether sulfates.

136. The water-based drilling fluid of claim 134 wherein said fluid consists essentially of additives other than a solid bridging agent.

137. The water-based drilling fluid of claim 134 wherein said effective fluid loss control properties comprise a fluid loss of about 5 ml./30 min. or less using the standard dynamic filtration fluid loss test.

138. The water-based drilling fluid of claim 134 wherein said surfactant is effective to emulsify said water emulsifiable material and to produce emulsion droplets having an average diameter of about 30 microns or less.

139. The water-based drilling fluid of claim 134 wherein said surfactant is effective to emulsify said water emulsifiable material and to produce emulsion droplets having an average diameter of about 20 microns or less.

140. The water-based drilling fluid of claim 134 having a density of about 7.9 lb./gal. or more.

141. A water-based drilling fluid comprising:
an aqueous base comprising a concentration of about 20 vol. % or less non-toxic water emulsifiable material as an internal phase;
a blend of water soluble polymers comprising synthetically modified starch and from about 40 wt. % to about 60 wt. % modified polysaccharide; and,
an amount of surfactant selected from the group consisting of alkyl sulfates and alkyl ether sulfates in association with said water soluble polymer;
wherein said quantity, said amount, and said association provide said water based drilling fluid with effective rheology and fluid loss control properties comprising a low shear rate viscosity of about 70,000 cP or more upon exposure to 0.3 rpm, measured with a Brookfield viscometer at 75° F.

142. The water-based drilling fluid of claim 141 wherein said fluid consists essentially of additives other than a solid bridging agent.

143. The water-based drilling fluid of claim 141 wherein said effective fluid loss control properties comprise a fluid loss of about 5 ml./30 min. or less using the standard dynamic filtration fluid loss test.

144. The water-based drilling fluid of claim 141 wherein said concentration is from about 2 to about 20 vol. %.

145. The water-based drilling fluid of claim 141 wherein said surfactant is effective to emulsify said water emulsifiable material and to produce emulsion droplets having an average diameter of about 30 microns or less.

146. The water-based drilling fluid of claim 141 wherein said surfactant is effective to emulsify said water emulsifiable material and to produce emulsion droplets having an average diameter of about 20 microns or less.

147. The water-based drilling fluid of claim 141 having a density of about 7.9 lb./gal. or more.

148. A water-based drilling fluid comprising:
an aqueous base comprising a concentration of about 20 vol. % or less non-toxic water emulsifiable material as an internal phase;
about 2 lb./bbl. or more water soluble polymer comprising about 50/50 wt. % modified xanthan polysaccharide and synthetically modified starch; and,
about 0.2 lb./bbl. or more surfactant selected from the group consisting of alkyl sulfates and alkyl ether sulfates in association with said water soluble polymer;
wherein said water soluble polymer, said surfactant, and said association provide said water-based drilling fluid with effective rheology and fluid loss control properties.

149. The water-based drilling fluid of claim 148 wherein said effective rheology and fluid loss control properties comprise a low shear rate viscosity of about 70,000 cP or more upon exposure to 0.3 rpm, measured with a Brookfield viscometer at 75° F.

150. The water-based drilling fluid of claim 148 wherein said concentration is from about 2 to about 20 vol. %.

151. The water-based drilling fluid of claim 148 wherein said fluid consists essentially of additives other a solid bridging agent.

152. The water-based drilling fluid of claim 148 wherein said effective fluid loss control properties comprise a fluid loss of about 5 ml./30 min. or less using the standard dynamic filtration fluid loss test.

153. The water-based drilling fluid of claim 148 wherein the quantity of water-soluble polymer is from about 2 lb./bbl to about 7.5 lb./bbl.

* * * * *

UNITED STATES PATENT AND TRADEMARK OFFICE
CERTIFICATE OF CORRECTION

| | | |
|---|---|---|
| PATENT NO. | : 7,148,183 B2 | |
| APPLICATION NO. | : 10/023273 | |
| DATED | : December 12, 2006 | |
| INVENTOR(S) | : Lirio Quintero | |

It is certified that error appears in the above-identified patent and that said Letters Patent is hereby corrected as shown below:

Column 2, line 40, please delete "polalphaolefins" and insert -- polyalphaolefins --.

Column 3, line 64, please delete "XAN-PLEX D™" and insert -- XAN-PLEX™D --.

Column 4, line 13, please delete "XAN-PLEXT™D" and insert -- XAN-PLEX™D --.

Column 5, line 22, please delete "a".

Column 6, line 43, please delete "shale." and insert -- shale --.

Column 7, line 50, please delete "obtained" and insert -- (obtained --.

Column 8, line 17, please delete "P-400" and insert -- P-4000 --.

Column 8, line 18, please delete "P-400" and insert -- P-4000 --.

Column 8, line 22, please delete "0.2 to 2" and insert -- 0.5 to 6.0 --.

Column 8, line 26, please delete "0.2 to 2 lb./bbl" and insert -- 0.5 to 6.0 lb/bbl --.

Column 8, line 49, please delete "show" and insert -- shows --.

Column 9, line 16, please delete "lbf/100" and insert -- lb/100 --.

Column 9, line 34, please delete "lbf" and insert -- lb --.

Column 9, line 64, please delete "0" and insert -- 3.0 --.

Column 10, line 30, please delete "0.2 to 2lb/bbl." and insert -- 0.5 to 6.0lb/bbl. --.

UNITED STATES PATENT AND TRADEMARK OFFICE
CERTIFICATE OF CORRECTION

PATENT NO. : 7,148,183 B2
APPLICATION NO. : 10/023273
DATED : December 12, 2006
INVENTOR(S) : Lirio Quintero It is certified that error appears in the above-identified patent and that said Letters Patent is hereby corrected as shown below:

Column 12, please delete the Table on lines 10-32 and insert the following table:

| -- | Dynamic Filtration | -- |
|---|---|---|
| Additives | Formulation 1, Cumulative Filtration, ml T- 200°F Speed = 100 rpm Disk with 0.4 D and 3 microns | |
| Water, bbl | 0.95 | |
| Modified polysaccharide polymer/ starch derivative, lb/bbl | 6 | |
| Surfactant, lb/bbl | 6 | |
| Monoethanolamine, lb/bbl | 0.5 | |
| Sodium formate, lb/bbl | 5 | |
| GT-2700™, bbl | 0.05 | |
| Rev-Dust, % wt/wt | 2 | |
| Time, minutes | ΔP= 500 psi | |
| 0 | 0 | |
| 1 | 5.0 | |
| 5 | 6.4 | |
| 10 | 6.6 | |
| 15 | 7.2 | |
| 20 | 7.8 | |
| 25 | 8.0 | |
| 30 | 8.4 | |
| Spurt loss/ 30 min filtrate*2, ml | 5.0/16.2 | |

Column 13, please delete the Table on lines 1-10.

Column 13, line 13, please delete "mL" and insert -- ml --.

Column 13, line 32, please delete "(g/L)" and insert -- (g/l) --.

Column 13, line 32, please delete "(mN/m)" and insert -- (nN/m) --.

Column 13, line 44, please delete "mN/m" and insert -- nN/m --.

Column 13, line 45, please delete "g/L" and insert -- g/l --.

Column 14, line 39, after "other" please insert -- than --.

UNITED STATES PATENT AND TRADEMARK OFFICE
CERTIFICATE OF CORRECTION

PATENT NO. : 7,148,183 B2
APPLICATION NO. : 10/023273
DATED : December 12, 2006
INVENTOR(S) : Lirio Quintero It is certified that error appears in the above-identified patent and that said Letters Patent is hereby corrected as shown below:

Column 14, line 54, please delete "16ss" and insert -- loss ---

Column 16, line 62, please delete "rpm" and insert -- min. --.

Column 18, line 4, after "of" please insert -- from --.

Column 18, line 5, please delete "42,500,000" and insert -- 2,500,000 --.

Column 18, line 9, please delete "about".

Column 19, line 7, after "viscometer" please insert -- at --.

Column 19, line 9, after "is" please delete ",".

Column 19, line 29, after "other" please insert -- than --.

Column 19, line 45, please delete "c".

Column 20, line 2, after "of" please insert -- from --.

Column 20, line 4, please delete "any of".

Column 20, line 4, please delete "claims" and insert -- claim --.

Column 20, line 8, after "of" please delete "about".

Column 20, line 12, after "of" please insert -- from --.

Column 20, line 46, please delete "69" and insert -- 99 --.

Column 20, line 63, after "other" please insert -- than --.

Column 21, line 34, after "of" please insert -- from --.

Column 22, line 41, after "of" please insert -- from --.

Column 22, line 45, please delete "about".

UNITED STATES PATENT AND TRADEMARK OFFICE
CERTIFICATE OF CORRECTION

PATENT NO. : 7,148,183 B2
APPLICATION NO. : 10/023273
DATED : December 12, 2006
INVENTOR(S) : Lirio Quintero It is certified that error appears in the above-identified patent and that said Letters Patent is hereby corrected as shown below:

Column 22, line 58, please delete "Water" and insert -- water --.

Column 24, line 36, after "other" please insert -- than --.

Signed and Sealed this

Twenty-sixth Day of June, 2007

JON W. DUDAS
*Director of the United States Patent and Trademark Office*